Patented Apr. 22, 1924.

1,491,588

UNITED STATES PATENT OFFICE.

LOUIS DUPARC AND CHARLES URFER, OF GENEVA, SWITZERLAND.

PROCESS FOR THE PRODUCTION OF CATALYSTS AND THE PRODUCT THEREOF.

No Drawing.   Application filed February 26, 1920. Serial No. 361,587.

*To all whom it may concern:*

Be it known that we, LOUIS DUPARC and CHARLES URFER, citizens of Switzerland, residing at Geneva, Switzerland, in the Confederation of Switzerland, have invented certain new and useful Improvements in Processes for the Production of Catalysts and the Product Thereof, of which the following is a specification.

In the processes for the fixation of nitrogen, such as for example the synthetic preparation of ammonia by starting from nitrogen and hydrogen, good results are obtained by utilizing as catalysts metals which yield nitrides directly when they are heated in the presence of nitrogen and which nitrides decompose when they are heated in a current of hydrogen. These metals alone or mixed with each other or with their nitrides, or even these nitrides alone or mixed are employed in a very finely divided state. They may be the following elements: lithium, cerium, uranium, lanthanum, thorium, titanium, the alkali earth metals such as calcium, barium and strontium, then glucinium, zirconium, vanadium, molybdenum, etc. A mixture of these metals or their nitrides with metals of the platinum group may also be employed. The catalysts formed by the aid of these metals permit of effecting the reactions without high pressure, for example at atmospheric pressure, and at temperatures which are comparatively low and may vary between 350° and 600° C. as is described in our copending application No. 361,586, filed February 26, 1920. It has been found that the best results can be obtained while yet remaining below the upper limit of temperature by employing compositions containing in an extremely finely divided state, the active metals or their nitrides or also mixtures of these metals and of their nitrides. These compositions are prepared according to a special process and it is this process which forms the subject matter of the present invention.

According to this process we cause to react in a vacuum or in an atmosphere of nitrogen or in air with a reducing metal, such as for example aluminium, and magnesium or calcium, at least one oxide of metals which when heated with nitrogen, yield nitrides directly and these nitrides decompose when they are heated in a current of hydrogen. The temperature of the reaction varies according to the nature of the reducing metal and of the oxide to be reduced. After cooling down a pulverulent and in some cases pyrophorous mass is obtained which comprises at least in part the reduced metal or its nitride in a very finely divided state and distributed over the oxide of the reducing metal, this oxide (alumina, magnesia or lime) serving as an inert carrier for the active metal. This latter may be alone or mixed with the nitride which forms at the time of the reduction of the oxide in nitrogen or in air. It is intimately mixed with the inert carrier.

The composition thus obtained forms a very active catalyst which may with advantage serve for example in the synthesis of ammonia at atmospheric pressure and at comparatively low temperature, or in other processes for the fixation of nitrogen.

The oxides which can be used for the preparation of this composition according to the present invention are the following: oxide of lithium, uranium, cerium, lanthanum, thorium, titanium, the alkali earth metals such as calcium, barium and strontium, glucinium and zirconium, vanadium, molybdenum, tungsten, etc.

The cooling down of the composition after the reduction of the oxide may be effected in air or better in pure nitrogen. In this latter case a composition is obtained which besides pure divided metal contains mainly the nitride of this metal which renders the composition still more active as a catalyst particularly for the fixation of nitrogen, than if it contains only the pure metal.

To prepare the composition according to the present process we may proceed for example as follows:—

1. Quick lime finely powdered is intimately mixed with very finely powdered aluminium. This mixture is placed in a crucible and a ribbon of magnesium introduced into it which is ignited as is ordinarily done in alumino thermics. The reaction may take place in the vacuum, open air or in nitrogen. The composition is allowed to cool in an atmosphere containing nitrogen. This composition forms a powder, and is composed of alumina carrying calcium in an extremely finely divided state and the nitride of this metal. This composition has the property of permitting in the synthesis of ammonia the reaction between N and 3H at a temperature which is considerably lower than that which would be necessary in order to effect this reaction by only employing as a catalyst calcium alone or its nitride even in a very finely divided state. Thus metallic calcium only acts on the gaseous mixture of nitrogen and hydrogen at 600° C. while if it is distributed on alumina as above indicated it reacts at about 400° C.

2. Oxide of cerium is intimately mixed with 1¼ parts by weight of very finely powdered aluminium from which all fatty substance has first been removed. This mixture is heated in an atmosphere of nitrogen until the reduction of the oxide of cerium has taken place. After cooling in nitrogen a black pyrophorous mass is obtained which at the same temperature, in a similar manner, absorbs nitrogen or hydrogen.

A composition may be obtained from magnesium by mixing an oxide with powdered magnesium under the same conditions as for aluminium. The reaction is much more energetic than it is with this latter metal.

In the cases where the reduction with aluminium or magnesium is very energetic, as is the case with oxide of lithium, calcium may be employed as reducing metal.

In order to obtain a greater dilution of the active metal and of its nitride in the mass of the carrier the reaction may be repeated on the product obtained in a first operation by adding a determined quantity of aluminium, or magnesium or calcium according to the type of this composition.

When the catalytic power of the mass diminishes the catalyst can be regenerated by adding to the mass aluminium, magnesium or calcium and also a quantity of fresh oxide so that the proportion of metal in the new composition obtained after reduction remains constant.

The compositions which can be prepared according to the process described are the following;

1. Lithium and alumina or lithium and magnesia or lime.
2. Cerium and alumina or cerium and magnesia or lime.
3. Uranium and alumina or uranium and magnesia or lime.
4. Calcium and alumina or calcium and magnesia.
5. Barium and alumina or barium and magnesia or lime.
6. Strontium and alumina or strontium and magnesia or lime.
7. Lanthanum, thorium, titanium and alumina or lanthanum, thorium, titanium and magnesia or lime.
8. Zirconium and alumina or zirconium and magnesia or lime.
9. Vanadium and alumina or vanadium and magnesia or lime.
10. Molybdenum and alumina or molybdenum and magnesia or lime.
11. Tungsten and alumina or tungsten and magnesia or lime.

Beside these metals in a pure state these compositions may contain a more or less large proportion of the nitride of these metals as has been stated above.

We claim:

1. The process for the production of a composition for use as a catalyst especially in processes for the fixation of nitrogen, consisting in causing an oxide of a metal which when heated with nitrogen yields a nitride directly and which nitride decomposes when heated in a current of hydrogen, to react with a reducing metal, and then cooling the mass thus obtained which contains at least in part the reduced metal or its nitride in a finely divided state distributed over the oxide of the reducing metal which serves as an inert carrier.

2. The process for the production of a composition for use as a catalyst especially in processes for the fixation of nitrogen, consisting in causing an oxide of a metal which when heated with nitrogen yields a nitride directly and which nitride decomposes when heated in a current of hydrogen, to react with aluminum as a reducing metal and then cooling the pulverulent mass obtained which contains in part the reduced metal in a finely divided state distributed over the oxide of aluminum which serves as a carrier.

3. The process for the production of a composition for use as a catalyst especially in processes for the fixation of nitrogen, consisting in causing the oxide of cerium to react with aluminum as a reducing metal in an atmosphere containing nitrogen and cooling the pulverulent mass thus obtained which when cooled contains in part the reduced cerium and nitride of cerium in a finely divided state mixed with the oxide of aluminum which serves as an inert carrier.

4. The process for the production of a composition for use as a catalyst especially in processes for the fixation of nitrogen, consisting in causing an oxide of metal which when heated with nitrogen yields a nitride directly and which nitride decomposes when heated in a current of hydrogen, to react with a reducing metal, and then using nitrogen to cool the pulverulent mass thus obtained which contains at least in part the reduced metal or its nitride in a finely divided state distributed over the oxide of the reducing metal which serves as an inert carrier.

5. The process for the production of a composition for use as a catalyst especially in processes for the fixation of nitrogen, consisting in causing an oxide of a metal which when heated with nitrogen yields a nitride directly and which nitride decomposes when heated in a current of hydrogen, to react with aluminum as a reducing metal and then using nitrogen to cool the pulverulent mass thus obtained which contains in part the reduced metal in a finely divided state distributed over the oxide of aluminum which serves as a carrier.

6. As a new product of manufacture, a catalyst comprising a pulverulent mixture of a carrier and a reduced metal, which metal when heated with nitrogen yields a nitride at atmospheric pressure and the nitride of which decomposes when heated in a current of hydrogen.

7. As a new product of manufacture, a catalyst comprising a mixture of oxide of aluminum and metallic cerium.

8. As a new product of manufacture, a catalyst comprising a finely divided mixture of oxide of aluminum, metallic cerium and nitride of cerium.

In testimony whereof we affix our signatures in presence of two witnesses.

LOUIS DUPARC.
CHARLES URFER.

Witnesses:
LOUIS H. MUNICY,
ROD. DE WITT TUMBOR, Jr.